United States Patent [19]

Wessel et al.

[11] Patent Number: 4,718,221
[45] Date of Patent: Jan. 12, 1988

[54] LAWNMOWER EDGER AND TRIMMER

[76] Inventors: Lloyd E. Wessel, 2810 Meadow Dr.; Edward O. Wessel, 3116 Cawein Way, both of Louisville, Ky. 40220

[21] Appl. No.: 865,624

[22] Filed: May 21, 1986

[51] Int. Cl.$^4$ ............................................. A01D 34/84
[52] U.S. Cl. ...................................... 56/16.9; 56/13.7; 56/256
[58] Field of Search ..................... 172/13-17; 56/13.7, 16.9, 256, 295, 17.4, 320.1, 2

[56] References Cited

U.S. PATENT DOCUMENTS

| | | |
|---|---|---|
| 117,485 | 7/1871 | Tournier . |
| 1,010,260 | 11/1911 | Hill . |
| 1,065,946 | 7/1913 | Janson . |
| 1,127,764 | 2/1915 | Huck . |
| 1,181,281 | 5/1916 | Albert . |
| 1,561,823 | 11/1925 | Bishop . |
| 1,654,574 | 1/1928 | Brown . |
| 1,720,169 | 7/1929 | Cripe . |
| 1,732,308 | 10/1929 | Livingston . |
| 1,763,339 | 6/1930 | Beck . |
| 1,770,434 | 7/1930 | Schleicher . |
| 2,270,649 | 1/1942 | Corley . |
| 2,483,935 | 10/1949 | Ridenour . |
| 2,506,366 | 5/1950 | Korn . |
| 2,525,944 | 10/1950 | Ralston . |
| 2,608,043 | 8/1952 | Berdan . |
| 2,663,137 | 12/1953 | Asbury . |
| 2,682,825 | 7/1954 | Warholoski . |
| 2,686,364 | 8/1954 | Arnoldy . |
| 2,707,858 | 5/1955 | Norton et al. . |
| 2,725,813 | 12/1955 | Stoeber . |
| 2,791,875 | 5/1957 | Faas . |
| 2,901,878 | 9/1959 | Johnson . |
| 2,906,080 | 9/1959 | Light, Sr. . |
| 3,003,301 | 10/1961 | Koon .................................. 56/256 |
| 3,019,844 | 2/1962 | Key ..................................... 56/256 |
| 3,053,035 | 9/1962 | Earley . |
| 3,057,411 | 10/1962 | Carlton . |
| 3,097,703 | 7/1963 | Alvik . |
| 3,125,165 | 3/1964 | Boudreaux et al. . |
| 3,130,793 | 4/1964 | Allegretti . |
| 3,150,720 | 9/1964 | Hartnett . |
| 3,192,693 | 7/1965 | Bergeson . |
| 3,322,201 | 5/1967 | Ballister . |
| 3,357,497 | 12/1967 | Simolka . |
| 3,421,300 | 1/1969 | Rhodes . |
| 3,475,887 | 11/1969 | Price . |
| 3,489,225 | 1/1970 | Bass .................................... 172/15 |
| 3,668,845 | 6/1972 | Parker . |
| 3,690,384 | 9/1972 | Patterson . |
| 3,710,563 | 1/1973 | Polette . |
| 3,907,039 | 9/1975 | Remley et al. . |
| 3,907,040 | 9/1975 | Trusty . |
| 4,200,155 | 4/1980 | Mullet et al. . |
| 4,318,267 | 3/1982 | Green . |
| 4,453,372 | 6/1984 | Remer ................................. 56/256 |
| 4,464,544 | 8/1984 | Carsello et al. . |
| 4,478,028 | 10/1984 | Dawson, Jr. ....................... 56/256 |
| 4,551,967 | 11/1985 | Murcko .............................. 56/256 |
| 4,642,976 | 2/1987 | Owens . |

Primary Examiner—Stephen J. Novosad
Assistant Examiner—Bruce M. Kisliuk
Attorney, Agent, or Firm—Wood, Herron & Evans

[57] ABSTRACT

A rotary lawnmower has an edger/trimmer including a freely rotatable disk disposed with a vacuum zone of the mower when in an edging position. In a retracted position, the edger is withdrawn fully inboard of the outer periphery of the mover housing such that no projections are left to interfere with close-in mowing. Guards are provided for the edging disk when in a stowed position, and in an edging position. An alternate embodiment provides for lifting the edger over obstruction when the edger is used on a riding mower. A trim position for trimming around foundations and the like is provided, together with methods of edging.

10 Claims, 14 Drawing Figures

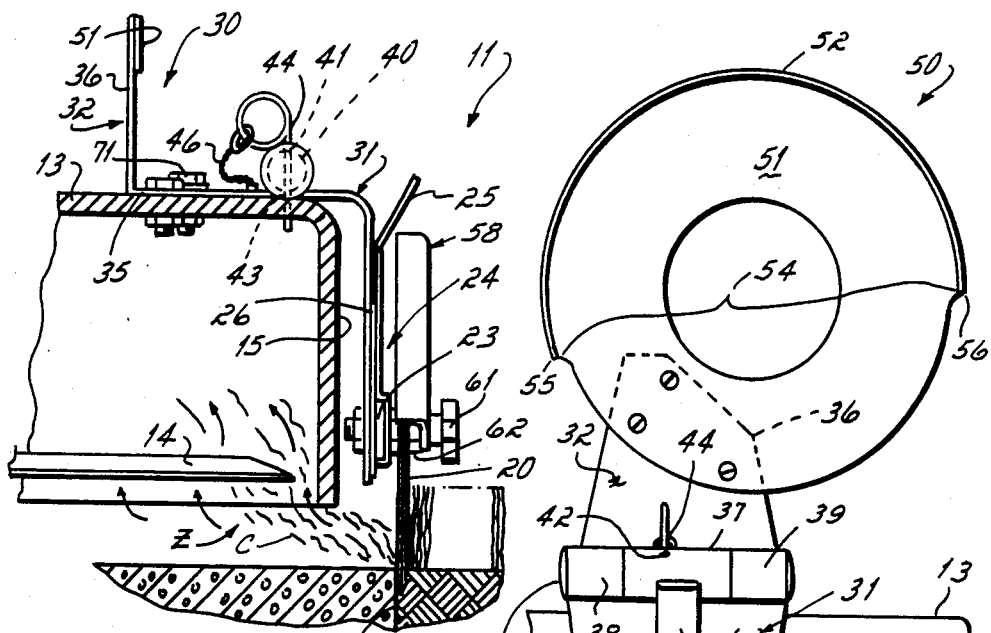
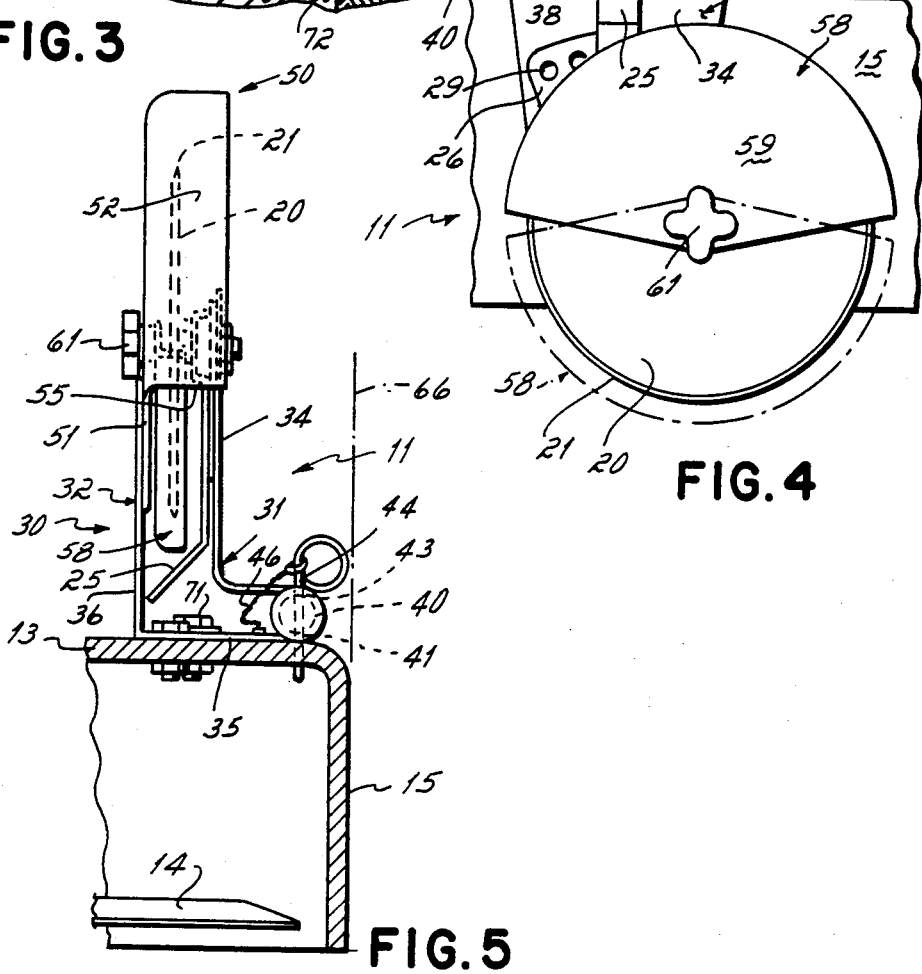

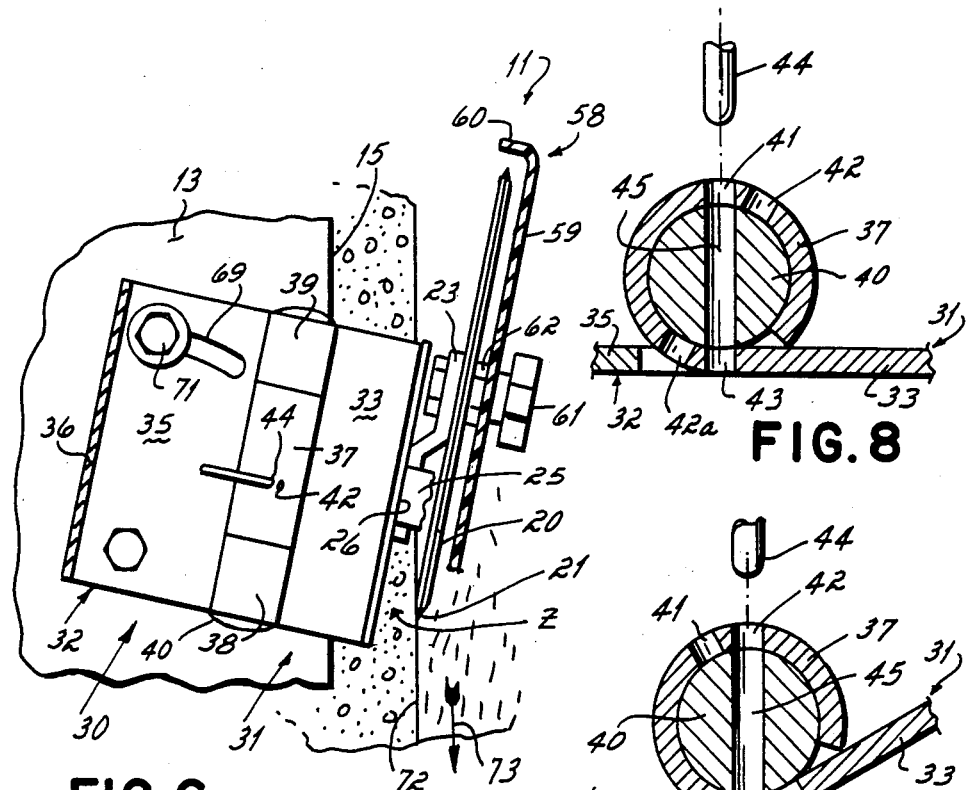
FIG. 8
FIG. 6
FIG. 9
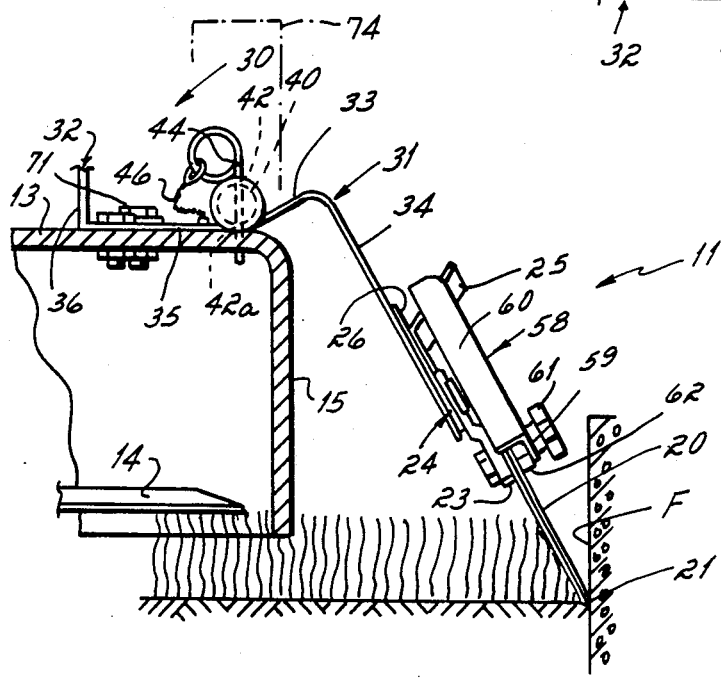
FIG. 7

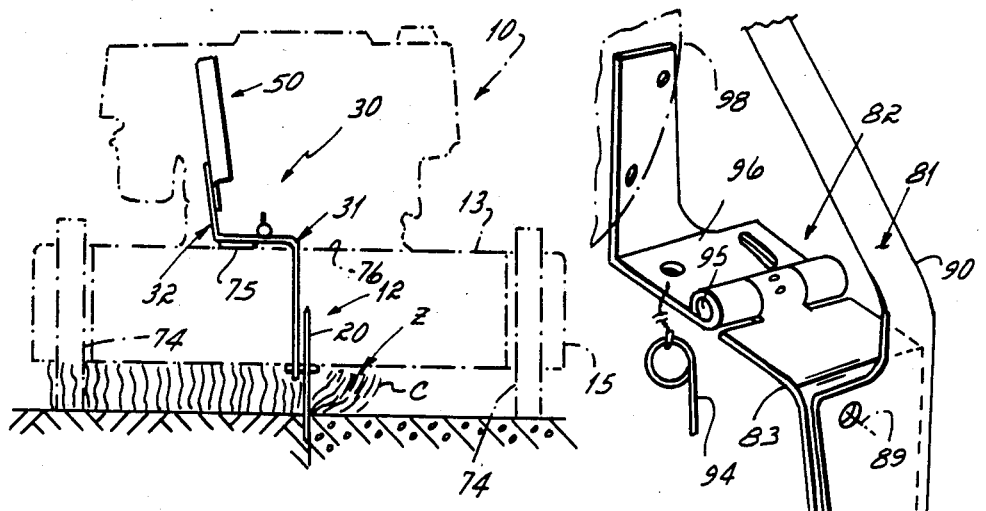
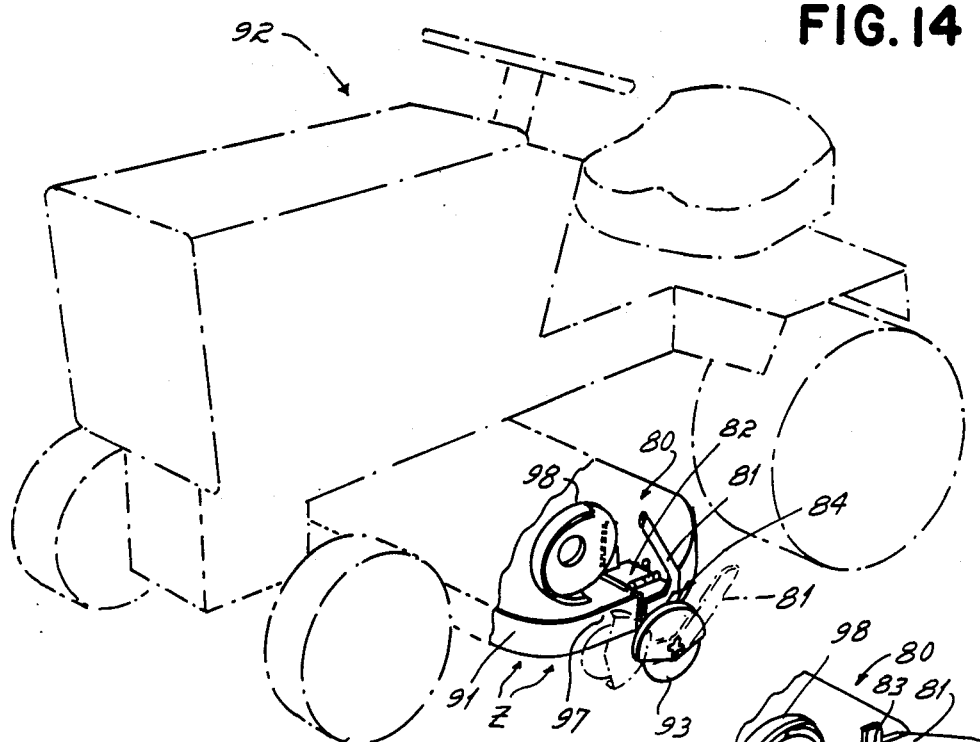

LAWNMOWER EDGER AND TRIMMER

This invention relates to a lawnmower edging and trimming apparatus, and more particularly to apparatus coupled with a rotary lawnmower for edging and trimming grass in lawns. Even more specifically, this invention relates to apparatus which facilitates clean, precise law edging and trimming with means for dispersing or collecting the cuttings with minimum effort and without damaging adjacent turf and pavement surfaces.

Heretofore, there have been many methods for maintaining well-manicured lawns, particularly at their edges adjacent streets or walks and adjacent obstacles protruding from the turf above the grass to be cut. These methods have not been without difficulties in that they were laborious, time consuming and messy. The results were often a jagged, uneven lawn edge with unsightly damage to the adjacent turf that encouraged the growth of weeds and undesirable grasses.

One such method has involved trenching to provide a definition or trim line between the lawn and pavement areas, for example. This involved the digging out of turf and the optional application of a chemical, such as sodium chloride, to prevent regrowth of grass. This usually resulted in an irregular, jagged trim line and in discoloration due to the uncontrollable leaching of the chemical used.

Other early edging methods involved manually operated shear disk and scissor type devices mounted on extended handles. These devices required a strenous amount of manual downward force and energy to produce a shearing action on the turf. An equal or greater amount of simultaneous manual force and energy was required for propelling these devices forward along the line to be trimmed and edged. A step was provided on some models for exerting downward force, but this was at best a very awkward, physical and occasionally frustrating operation.

The use of small electric motors and gasoline engines in hand-held lawn tools resulted in the development of expensive high speed rotating metal blades and flexible cord edging and trimming devices mounted on extended handles. Controlled precise edging and trimming is difficult due to the extended handles that offer no vertical or horizontal guiding surface. In addition, flexible cord edgers and trimmers are ineffective on tough grasses and turf encountered in the late summer and fall seasons. The tough grasses are resistant to the cord's abraiding action to a degree that the swirling cord will abraid on the adjacent pavement's rough surface and break too often before abraiding the tough turf and grasses.

In another form, a gasoline engine or electric motor was assembled to a wheeled frame to drive a rotating blade in a vertical or inclined plane for edging lawns along pavement. The gasoline engine edger and trimmer is expensive and is thought by many to be a very dangerous piece of equipment. It is imperative that the operator wear eye protection and protective clothing. The partially protected vertical rotating metal blade is driven at high speeds in a plane of rotation in direct line with the operator. This results in the cuttings and any rocks, glass or debris in the area being thrown randomly and directly toward the operator.

The rotating blade is always in a position to, and does, strike the pavement in jack-hammer fashion due to minimum operator control in guiding this edger/trimmer along the pavement. The possibility of striking the pavement is so prevalent that the blade is usually manufactured of a soft steel so that it will not break due to brittleness. Such soft steel wears more quickly and does not retain a sharp edge as desired and as could be provided if a harder steel could be used.

Despite these disadvantages, this edger-trimmer continues to be marketed by a number of different manufactures. The continuing manufacture of this edger is dictated by the dire need of a means to edge and trim tough turf and grasses.

Following the use of known edger devices, a motorized blower or a broom is required for cleaning the pavement areas adjacent the edged lawn. While one such known edger provides a vacuum collector, the aggressive action of the edger blade throws turf, soil and clippings away from the device where the debris cannot be picked up by the vacuum action. Clean-up requires further vacuuming or sweeping. These edgers are expensive for the average homeowner.

The above stated difficulties encountered over the years, and to this day, are evident by currently observing the amount of turf growth around pavement areas. The growth often extends up to six inches over the pavement especially in the late summer and fall seasons. This amount of turf growth reflects the reluctance for performing the toilsome and ofttimes expensive task of edging and trimming.

It has also been proposed to incorporate power driven edger blades with gasoline-powered rotary mowers, however, these devices are beset with a number of inherent disadvantages. for example, the whirling blades are subject to wear and dangerous breakage, and their action tends to throw debris all over, making it difficult to clean up.

Several of these edging units are mounted closely adjacent the lawnmower housings, and detract from mowing efficiency of the mowers due to their projection outwardly of the mower housing. Manufacturers tend to provide rotary mower housings with at least one side having an outer periphery closely adjacent the rotary blade. This permits for the close-in cutting of grass adjacent obstructions protruding upwardly from the turf, such as fences, trees, bushes, foundations, etc. Where an edging unit is located outwardly of the housing periphery, this close-in mowing function of the mower is destroyed.

Accordingly, it is an object of the invention to provide a rotary lawnmower with an improved edger and trimmer which is safe and convenient to use.

A further object of this invention is to provide a rotary lawnmower with an edger for precise edging and trimming of lawns within a vacuum zone of a collection device on the mower, providing for thorough clipping pick up.

Another object of this invention is to provide an edger adaptable for connection to a rotary mower for both edging and trimming tough turf and grasses, and which does not interfere with the close-in mowing capabilities of the mower.

Another object of this invention is to provide an edger and trimmer that in combination with a rotary lawnmower will vacuum up the grass cuttings and disperse them or collect them if the mower has bagging capabilities.

Still another object of this invention is to provide an edger/trimmer apparatus for use with a rotary lawnmower permitting trimming around foundations.

Another object of this invention is to provide an edger that can be mounted on rotary blade power mowers, whether pushed or power propelled, and on riding rotary blade power mowers or tractors.

A further object of this invention is to provide an adjustable edger which can be incorporated into rotary lawnmowers as original equipment or can be retrofitted to existing mowers.

Another object of this invention is to provide an edger for a rotary lawnmower and which is effective to edge lawns when the lawnmower is operated either on the pavement or on the grass surface adjacent a lawn edge.

These objectives and advantages are accomplished by an improved rotary lawnmower edger and trimmer, according to a preferred embodiment of the invention, wherein the mower is provided with vacuuming means defined in part by a housing and rotary blade. A free, rotating, edged, shearing or cutting disk is mounted on the housing of a push type or a power propelled type rotary blade power mower. The shearing disk is normally mounted on the deck of the mower housing at the side of the lawnmower opposite the exhaust chute, and within the normal vacuuming zone generated by the housing and rotary blade. By reason of the fact that the cuttings will be sheared when within the inherent vacuum zone produced by the lawnmower's rotating blade, they will be vacuumed up and dispersed, or bagged when the mower has a bagging capability.

An offset mounting hinge is used to secure the disk to the mower housing for movement between a retracted position and an edging position. In the edging position, the disk hangs over the outer side of the mower housing in a generally vertical disposition. In the retracted position, the disk and movable disk mounting apparatus are moved into a retracted position over the deck of the mower to leave the housing periphery totally free of any projection, and to thereby retain the close-in mowing capability of the mower. Thus, when the edger is mounted on the mower housing and is moved to the stowed retracted position, all normal mowing operations can be performed.

When edging is required, the shearing disk is hinged down and locked in the edging position by inserting a pin in positioning holes located through the hinge pin and in the pin channels formed in the hinge arms. The downward force required for shearing the turf is provided by the weight of the lawnmower. Precise linear movement of the shearing disk is provided by the lawnmower's supporting wheels. The lawnmower is advanced along the pavement to be edged in a slightly skewed movement by moderately pushing the mower or by utilizing the power feature of a power propelled mower. While not normally necessary of a power edging, power propulsion may be required for very heavy turf when the disk must cut through grass, roots and soil as well.

When trimming around foundations or above ground curbing, the shearing disk is tilted outwardly beyond the mower's wheels and locked in the trimming position by inserting a pin in the positioning holes. It thus is capable of such trimming by shearing grass off at an angle to horizontal.

When the grass or turf is particularly heavy, the invention contemplates an alternative embodiment wherein the edging disk is mounted on the front of a power propelled mower by using an adapter beam extending forwardly of the housing deck. The front mounted center position is recommended for edging extra heavy turf of more than a year's growth, for example, and more centrally aligns the shearing disk with the propelling force to overcome the added resistance provided by the turf. When the alternative edger mount supports the edger in the extended operating position, the lawnmower can still be maneuvered over and across pavement areas by simply tilting the mower up on the rear wheels.

The edger is provided with a circular guard and a disk guard which serve both separate and combined functions. The circular guard protects the disk, and prevents injury by the sharp disk edge when the disk is disposed in a retracted position over the deck of the mower. The disk guard extends partially around the upper periphery of the disk to cover it when it is in an edging position.

In order to provide a guard in close proximity to the stowed or retracted disk, the circular guard has a skirt extending over the disk edge. A relieved area is provided throughout a sector of this skirt. The disk guard is disposed in the relieved area and serves to cover a portion of the disk and complete the circular shrouding of its edge when it is stowed. When the disk is deployed for edging, the disk guard is rotated into position over the disk to shroud it in operating condition.

Accordingly, the invention provides an edger and trimmer in combination with a rotary lawnmower, which is easy to use, inexpensive, and which in combination with the mower provides edging, trimming and dispersal or pick-up of clippings. Moreover, the disk and mounting apparatus is fully retractable inboard of the housing so that it does not interfere with the normal close-in mowing capabilities of the mower.

Since the disk is freely rotatable and not powered, it can be manufactured from hard, treated steel. It thus holds an edge a long time and provides a safe rotatable but slow speed edging blade as opposed to the powered edgers.

These and other objectives and advantages will become even more apparent from the following written description of a preferred embodiment of the invention and from the drawings in which:

FIG. 3 is a cross-sectional view taken along lines 3—3 of FIG. 2;

FIG. 4 is an elevational view of the preferred edger taken along lines 4—4 of FIG. 2;

FIG. 5 is a cross-sectional view taken from the same reference as FIG. 3, but showing the edger in a stowed, retracted position;

FIG. 6 is a top plan view similar to FIG. 2, but showing the edger mounted in a toe-in disposition with the cross-sectional disk guard partially broken away;

FIG. 7 is a view similar to FIG. 3, but showing the edger in a "trim" position;

FIG. 8 is a cross-sectional view of the hinge and pin lock taken along lines 8—8 of FIG. 2;

FIG. 9 is a cross-sectional view of the hinge and pin lock similar to FIG. 8, but showing the elements in a "trim" position;

FIG. 11 is a front elevational view of the alternate edger mounted on the front end of a rotary mower as suggested in FIG. 1;

FIG. 12 is a perspective view showing the edger of the invention modified and mounted to a riding mower;

FIG. 13 is a partial view of FIG. 12, showing the edger in a stowed position; and FIG. 14 is a perspective view showing components of the edger of FIG. 12, but omitting the disk, disk guard and height adjusting mechanism for clarity.

Figure 1:
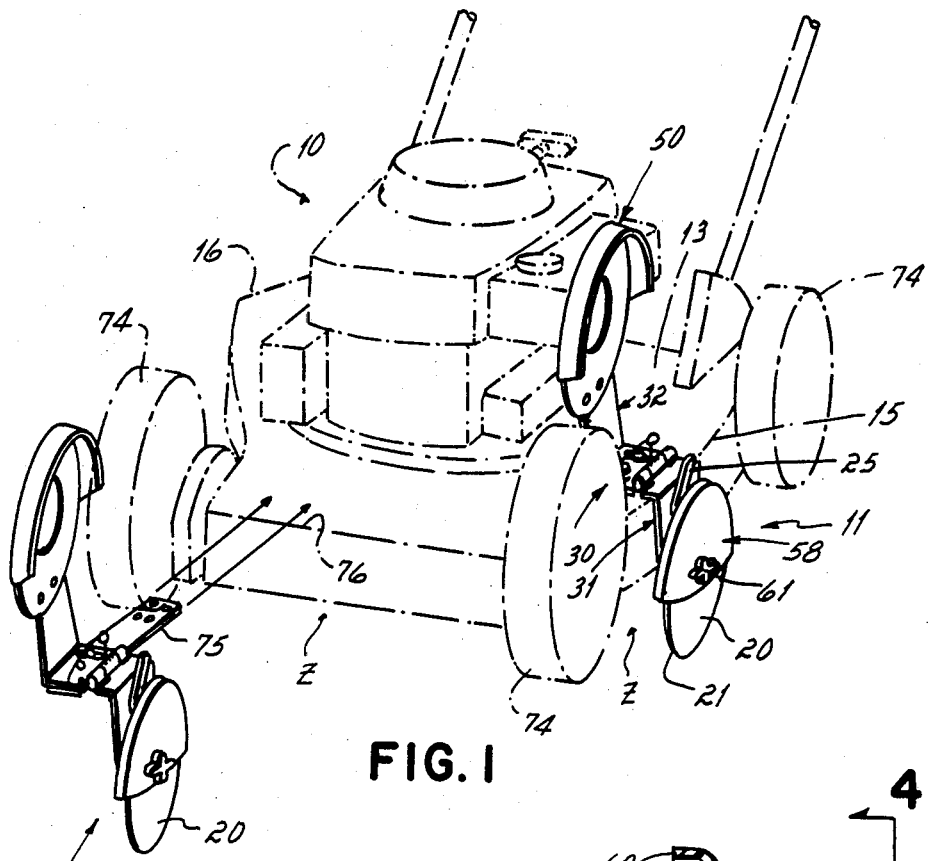
FIG. 1 is a perspective illustration of a rotary mower provided with an edger according to both a preferred and alternative embodiment of the invention.

Turning now to the drawings, there is shown in FIG. 1 a lawnmower 10 provided with an edger 11 according to the invention. Also shown in FIG. 1 is an alternate edger 12 mountable on the forward end of the lawnmower as suggested in FIG. 1 and which will be further described herein. It will be appreciated that only one edger is normally mounted to a single lawnmower at any one time. Either edger 11 or 12 could be mounted on the same mower simultaneously or at different times.

Moreover, it should be appreciated that the edger 11 according to the invention is particularly adapted for combination with a rotary lawnmower of the type having a housing 13 and a rotary blade 14 (FIG. 3). The lawnmower 10 can be a rotary lawnmower of the push type, a rotary lawnmower of the propelled type, or any other form of rotary lawnmower including a riding lawnmower or a tractor lawnmower with a rotary mower attachment. While an edger according to the invention is modified to be used with a riding or tractor type rotary lawnmower, many of the same features of such an edger, as will be described in further detail herein, are similar to those for the edger 11 as shown in FIG. 1.

It will be appreciated that the housing 13 has a predetermined outer skirt defining a periphery 15, which is shown in FIG. 1 at the lefthand side of the lawnmower. An exhaust chute 16 is provided on an opposite side of the lawnmower for the purpose of dispersing clippings cut by the lawnmower on the yard or for ejecting the clippings into a bag or collection device (not shown).

It will be further appreciated that the lawnmower 10 and particularly the housing 13 and blade 14 thereof define a vacuum zone identified by the letter Z in FIG. 1 and in other figures as appropriate. As the blade 14 rotates, it generates within the housing 13 a vacuum which serves to pull clippings, such as clippings C (FIG. 3), upwardly into the housing for discharge through the chute 16 for dispersal or collection.

Figure 10:
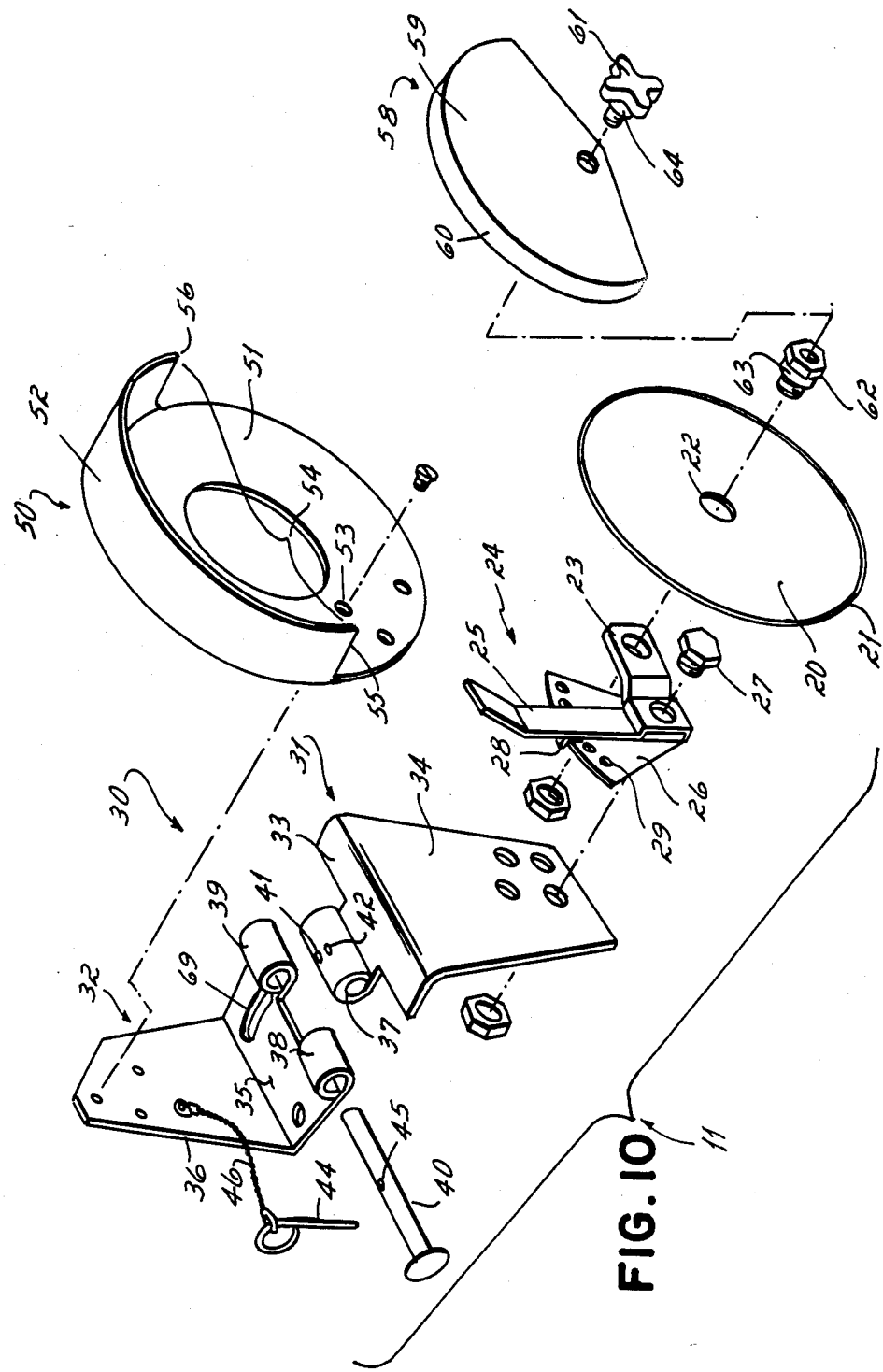
FIG. 10 is an exploded view of the elements of the edger of FIG. 1.

The components of the edger 11 are perhaps best seen in their exploded form in FIG. 10. The edger includes a hardened steel disk 20 having a sharpened circular edge 21 and a bore 22 therethrough for securing the disk 20 to lever arm 23 of a height adjusting apparatus 24. Height adjusting apparatus 24 also includes a lever arm 25 secured to plate 26 by a pivot bolt 27. Arm 25 is provided with detent means 28 cooperating with aperture means 29 in the plate 26 for releasably securing the arm 25 and the arm 23 in a specific rotational disposition with respect to the plate 26. Movement of the arm 25 adjusts the arm 23 and thereby the height of the disk as will be appreciated. The height adjusting apparatus 24 does not constitute an independent part of this invention apart from the other elements with which it is combined.

Disk mounting apparatus 30 is also seen in FIG. 10 and includes a hinge having hinge arms 31 and 32.

Hinge arms 31 and 32 comprise an offset hinge with hinge arm 31 having an arm 33 and an arm 34 attached at right angles thereto, while hinge arm 32 has an arm 35 with an arm 36 attached at right angles thereto. Arms 33 and 35 define respective hinge channels 37, 38 and 39 for receiving a hinge pin 40. Channel 37 is provided with a plurality of apertures 41, 42 (FIG. 10) and 43 (FIG. 8) for locking hinge arm 31 with respect to hinge arm 32 as will be described. A lock pin 44 is provided for extending through the apertures 41-43 and a bore 45 disposed transversely through the hinge pin 40. A lanyard 46 is provided for securing the hinge pin 44 to the mounting apparatus 30 by means of a suitable fastener to prevent loss of the pin. It will be appreciated that the hinge pin 40 is secured against rotation with respect to channels 38, 39.

In order to shroud the sharp edge 21 of the blade 20 when it is in a stowed position, the edger further includes a circular guard 50 having a back plate 51 and an annularly extending skirt 52 extending around a portion of the back plate 50. Apertures 53 are provided for securing the guard to the upstanding arm 36 of the hinge arm 32. A sector 54, defined by edges 55 and 56 of the skirt 52, is removed from the skirt to provide a relief area for receiving the arm 34 of the hinge arm 31 when the edger is disposed in its fully retracted and stowed position.

A disk guard 58 is provided with a cover plate 59 and a skirt 60 for protecting the top sharpened edge of the disk 20, when the disk is disposed in its edging position, and another peripheral edge of the disk when the disk is stowed in its retracted position within the circular guard 50.

The disk guard 58 is mounted coaxially with the disk 20 by means of the thumb screw 61 threaded into the securing bolt 62 holding the disk on the arm 23 of the height adjusting mechanism 24. It will be appreciated that the securing bolt 62 is provided with a shoulder 63 which is of slightly less diameter than the bore 22 within the disk 20. Also, the width of the shoulder 63 is slightly greater than the thickness of the disk 20 (and optionally also greater than the combined thickness of the disk 20 and the arm 23) such that the disk 20 is free to rotate on the securing bolt 62.

In addition, thumb screw 61 has a shoulder 64 which is approximately the same thickness as the backing plate 59 of the disk guard 58. The disk guard 58 is preferably made of a plastic, slightly deformable, material such that the disk guard 58 can be easily rotated about the thumb screw 61 into an appropriate position above the disk 20 when the disk is in an edging position and covering a portion of the sharpened edge 21 of the disk 20 at the corresponding open sector 54 of the circular guard 50 when the disk is moved to its retracted position.

Turning now briefly to FIGS. 4 and 5, the edger 11 is shown in both its edging position (FIG. 4) and its retracted position (FIG. 5). As shown in FIG. 4, the disk guard 58 is disposed over the top of the disk 20 when the disk is in its edging position. The phantom line 58 illustrates the rotational movement of the disk guard 58 to any specific position desired. It will be appreciated, however, that the solid line position of the guard 58 is usually desired. In FIG. 5, it will be appreciated that the disk guard 58 has been disposed to cover the sharpened edge 21 of the disk 20 in the relief area of the sector 54 provided between the edges 55 and 56 of the skirt 52 of the circular guard 50.

Also from FIG. 5, it will be appreciated that the edger 11 is disposed on the housing 13 such that all of the components of the edger, including the offset hinge mounting apparatus 30 and the disk itself are disposed inboard of the housing 13 and particularly the periphery 15 thereof, all as illustrated by the dotted line 66 when the disk is in its stowed or fully retracted position. This permits a user to move the lawnmower to a position closely adjacent any upstanding obstructions in order to cut grass growing closely thereto within the normal function of the mower, all by moving the lawnmower and its housing periphery 15 along and against such an obstruction.

Figure 2:
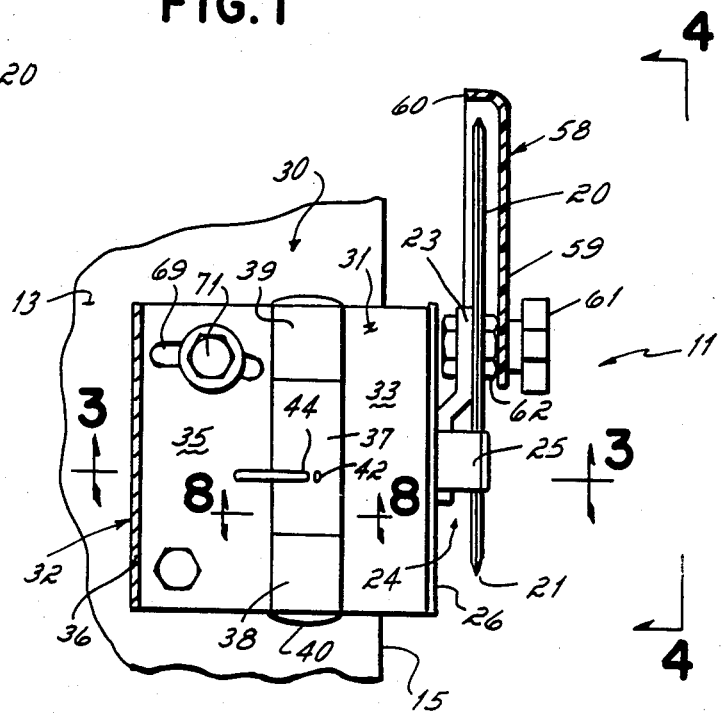
FIG. 2 is a top plan view of a portion of the mower of FIG. 1, showing the edger in an edging position and with the disk guard broken away and in partial cross-section for clarity.

Momentarily turning to FIGS. 2 and 6, it will also be appreciated that the hinge arm 35 is provided with at least one arcuate slot 69 for adjusting the toe angle of the edger 11. Accordingly, as shown in FIG. 2, a fastening bolt 71 is used to secure the leg 35 of the hinge arm 32 to the deck of the housing 13 and thereby align the blade 20 in a plane which is parallel to the normal motion of the mower. If it is desired to have the blade tend to hug the pavement against which lawn edging is taking place, the bolt 71 can be loosened and then secured within the slot 69 as shown in FIG. 6, such that the blade 20 is disposed in a plane bearing an acute angle with respect to an edge 72 of pavement. Motion of the mower and edger in the direction of arrow 73 will provide edging and at the same time the toe in angle will maintain the blade in contact with the edge 72 of the pavement. Conversely, the blade can be toed outwardly toward the pavement edge when the mower is operated on the grass surface.

Turning now to FIGS. 8 and 9, the mounting apparatus 30 and particularly the hinge area is depicted. As noted, the channel 37 of the hinge arm 31 is provided with apertures 41, 42 and 43. Apertures 41 and 43 are located at 180° around the channel 37 and with respect to each other, while the aperture 42 (and a complimentary aperture 42a) is located on the same axis spaced slightly axial from the apertures 41, 43. Accordingly, as shown in FIG. 8, the edger 11 can be locked in an edging position by pivoting the hinge arm 31 clockwise, as viewed in FIG. 8, and inserting the lock pin 44 through the aperture 41, the bore 45 of the hinge pin 40 and the aperture 43.

When it is desired to locate the edger in a trimming position for the purpose of trimming grass and turf adjacent an upstanding obstruction, such as a foundation F as shown in FIG. 7, the lock pin 44 is retracted from the mounting apparatus 30 and the hinge arm 31 rotated so that apertures 42 and 42a line up with the bore 45 in the hinge pin 40. Thereafter, the lock pin 44 is inserted therein (FIG. 7) to secure the edger in a trimming position. Note that although the edger extends outwardly of the mower housing periphery 15, and outwardly of any wheels 74 on this side of the mower when in a trim condition, upon retraction the edger 11 and the entire mounting apparatus 30 is located inboard of, or within, the periphery 15 as illustrated in FIG. 5. Note also that the edger 11, when in the edging position in particular, but also when in the trimming position, is located within the vacuum zone Z generated by the mower housing 13 and the rotating blade 14. Edged or trimmed clippings C are drawn within the vacuum zone upwardly into the housing for dispersal or collection through the chute 16.

In use, the edger 11 is moved into its edging position as shown in FIGS. 1-4 and 6. The mower is pushed along the edge of a yard in order to shear grass clippings and turf at the juncture of the yard or lawn and pavement edge, such as edge 72 (FIG. 3). It will be appreciated that the mower can be utilized either on the pavement, or can be turned around and placed on the grass, with the edging disk still extending down into the turf at the edge 72 of the pavement. This accommodates edging, whether or not the mower need be run on the grass surface or on the pavement surface.

When it is desired to use the edger for trimming, as shown in FIG. 7, the hinge arm 31 is simply rotated to the position shown, the locking pin 44 inserted, and the edger run through the grass so that the disk 20 cuts or shears grass clipping and turf adjacent an upstanding obstruction, such as the foundation 11.

Turning now to an alternative embodiment of the invention as shown in FIGS. 1 and 11, it should be appreciated that occasionally turf and grass may be so thick and heavy that it is necessary to utilize the invention on a self-propelled or power mower and to locate the edger 11 centrally of the mower. In this position, the shearing force of the edger can be more centrally aligned with respect to the drive forces exerted by the wheels of the mower. Accordingly, an adapter beam 75 is secured to the deck 76 of such a mower and extends forwardly thereof, so as to centrally mount the disk 20 of an edger 11 between the wheels 74 of a mower 10. Accordingly, the mower is run both on the grass and on the pavement with the disk 20 extending into the grass and turf at the edge 72 of the pavement to shear the grass and turf and to collect the clippings.

Of course, it will be appreciated that in some instances the grass and turf to be sheared includes some root structure and soil, or may otherwise be too heavy for the vacuum zone of the mower to lift. Nevertheless, the vacuum zone does lift substantial loose clippings up into the housing 13 for dispersal or collection.

It should thus be appreciated that the alternative embodiment, as illustrated at the forward end of the mower in FIG. 1 and in FIG. 11, provides a cutting or shearing of grass and turf forwardly of the mower and perhaps slightly forwardly of the vacuum zone Z of the mower. Nevertheless, as the grass is sheared or cut, the mower is thereafter run over any loose clippings, whereupon the vacuum zone of the mower is suitable to lift the clippings into the housing.

During use of the lawnmower 10 when fitted with an edger 11, whether the edger is on the side thereof or mounted on the front thereof, the mower is simply pushed along a pavement edge or foundation, for example, in order to edge or trim. Should a transverse pavement area be located, such as the juncture of a driveway or sidewalk for example, it is only necessary to push down on the mower handle and thereby raise the mower onto its back wheels. This lifts the edger 11 and the front wheels of the mower over the intervening pavement or obstruction.

It will also be appreciated that the invention can be utilized in conjunction with a riding mower or a riding tractor outfitted with a mower attachment. When the invention is to be utilized with such equipment, it will be appreciated that the equipment is usually too heavy to lift up to clear intervening pavement areas, for example. Accordingly, while the invention can be utilized with a riding mower or tractor, it is desirable to provide means by which the edger can be manually lifted by an operator sitting on the tractor in order to clear an obstruction.

Accordingly, an alternative embodiment of the invention is shown in FIGS. 12-14. The alternative embodiment shown in FIGS. 12 and 14 is essentially the same as that provided by the edger 11 as previously described, with the exception that the edger 80 of FIGS. 12-14 is provided with a manually operable lever arm 81 for the purpose of lifting the edging disk over obstructions. At the same time, positioning of the mounting apparatus 82 in an edging position can be immediately regained. Accordingly, the mounting apparatus 82 is identical to the mounting apparatus 30 of the edger 11, with the exception of the interposition of the lever arm 81 beneath the rotatable hinge arm 83 of the mounting apparatus 82, and the height adjusting apparatus 84 (which is similar to the height adjusting apparatus 24 of the edger 11).

The hinge arm 83 is provided with a stop 85 which prevents rearward movement of the lever arm 81 beyond the position as shown in FIG. 14. Such stop has two effective surfaces 86 and 87. Stop 86 is provided for engagement with a rearward portion 88 of the arm 81 to prevent further rearward motion of the entire edger apparatus 80 as the arm 81 pivots about the pivot 89 when the disk of the edger 80 is lowered into edging position. The stop 85 also includes a stop surface 87 which engages an area 90 of arm 81 to limit the clockwise motion of the arm 81 about pivot 89 and the lifting of the disk of the edger 80 in order to clear an obstruction.

Considering FIG. 12, it will be appreciated that the edger 80 is in an edging position. The edger 80 has been attached to a rotary mower attachment 91 secured on a riding tractor 92. The disk 93 is lowered beneath the attachment 91 for the purpose of edging.

When it is not desired to edge, the apparatus is rotated to the position as shown in FIG. 13. In particular, the locking pin 94 is removed from the mounting apparatus 82, similarly to that of the edger 11, to permit the hinge arm 83 to be rotated upwardly around the hinge pin 95 such that the hinge arm 83 lies closely adjacent the hinge arm 96. Thus the entire edger, including the disk 93 and all of the mounting components, are mounted within the periphery 97 of the mower attachment 91. This retains the close-in mowing capabilities of the mower 91. As well, of course, the disk 93 is disposed within a circular guard 98 in the same manner as that described with respect to edger 11.

When the disk is in the edging position, as shown in FIG. 12, and the mower approaches an intervening pavement for example, it is only necessary for the rider of the tractor to reach down and grasp the upper end of the arm 81 and rotate it rearwardly and downwardly in a clockwise direction about the pivot 89 (as viewed in FIG. 14), to raise the disk 93 to the position as shown in dotted lines in FIG. 12. In this position the disk 93 is not stored but can clear any obstruction. Also it will be appreciated that the disk can be moved to this position before the mounting apparatus 82 is operated to retract the disk to its retracted or stowed condition as shown in FIG. 13.

Again, however, it will be appreciated that the various features of the edger 11 have been maintained in this alternative embodiment including the capabilities of edging and trimming by the extension of the mounting apparatus 82 or by its retraction which completely protects the sharpened disk edge but as well removes any projection from the periphery of the mower to maintain close-in mowing capabilities. Also, the edger 80 can be extended to edge within a vacuum zone of the rotary mower 91 for the purpose of sucking up clippings into the mower for dispersal or collection, as appropriate.

These and other alternatives and modifications will become readily apparent to those of ordinary skill in the art without departing from the scope of this invention, and applicants intend to be bound only by the claims appended hereto.

We claim:

1. A rotary lawnmower having a housing, a rotary blade for cutting grass and generating a vacuum in a vacuum zone for lifting clippings up into said housing, and a lawn edger, said edger comprising:

a freely rotatable disk having a sharp circular edge for cutting grass within said vacuum zone;

means for mounting said disk on said housing for movement between at least a retracted position above and inboard said housing, and an edging position wherein said disk is disposed vertically below said housing at a distance sufficient to permit said disk to cut grass along the edge of a lawn within said vacuum zone; and said mounting means including a hinge having a first hinge arm fixed to said mower housing, a second hinge arm movably connected to said first arm and supporting said disk, and means to positively secure said second hinge arm to said first hinge arm in at least two predetermined positions corresponding respectively to said retracted position and said edging position in order to maintain said disk in said edging position upon contact of the disk with the grass.

2. A lawnmower as in claim 1, wherein said housing defines an edge periphery of said lawnmower and wherein said mounting means, when said disk is in said retracted position, is disposed entirely within the periphery of said lawnmower to permit movement of said mower into cutting position against upstanding obstructions in a lawn.

3. A lawnmower as in claim 1, wherein said mounting means is operable to dispose said disk in a third, trim position, angling outwardly and downwardly from said housing for trimming grass growing adjacent an upstanding obstruction in said lawn, and wherein said positive securing means is operative to positively secure said second hinge arm to said first hinge arm in a third predetermined position corresponding to said trim position.

4. A lawnmower as in claim 1, further including a circular guard disposed in a position for receiving said disk in a retracted position, for covering at least portions of said sharp circular edge, and further comprising a disk guard for covering the top edge of said disk when said disk is in an edging position and for covering a portion of an edge of said disk when said disk is in a retracted position within said circular guard.

5. A lawnmower as in claim 1, wherein said lawnmower is a riding mower providing a seat for an operator and further including manually operable means for raising said disk from said edging position, said manually operable means being operable by an operator seated on said riding lawnmower.

6. A lawnmower as in claim 1, wherein said mounting means is adjustable to mount said disk at one of a toe-in and toe-out angle with respect to normal forward travel of said lawnmower.

7. A lawnmower as in claim 1, further including means for adjusting the vertical disposition of said disk with respect to said second hinge arm and within said edging position.

8. An edging attachment for a rotary lawnmower having a housing defining a mowing periphery and attachment comprising:
- a freely rotatable edging disk having a circular sharp edge; and
- disk mounting apparatus for attaching said disk to a rotary lawnmower, said disk mounting apparatus including a selectively lockable pivot means for operably pivoting said disk for movement between at least a disk edging position extending outwardly of said housing and periphery and a disk retracted position within said periphery, said selectively lockable pivot means preventing disengagement of said disk from said edging position during an edging operation.

9. An edging attachment as in claims 8, further including a circular guard disposed on said disk mounting apparatus, wherein said circular guard includes an annular skirt for protecting said disk, and further including a relieved portion in the skirt of said circular guard, said attachment also including a disk guard for covering a top edge of said disk when said disk is in an edging position and said disk guard being rotatable to cover a portion of said disk which is not covered by said circular guard when said disk is in a retracted position.

10. An edging attachment as in claim 8, including means for adjusting the vertical disposition of said disk within said edging position and with respect to said selectively lockable pivot means.

* * * * *